(12) United States Patent
Stiehler et al.

(10) Patent No.: US 6,517,260 B2
(45) Date of Patent: *Feb. 11, 2003

(54) BELT CLIP MOVABLE TO READY AN ELECTRONIC DEVICE SUCH AS AN ELECTRONIC FLASH

(75) Inventors: Wayne E. Stiehler, Spencerport, NY (US); Paul Teremy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/808,845

(22) Filed: Mar. 15, 2001

(65) Prior Publication Data

US 2002/0131780 A1 Sep. 19, 2002

(51) Int. Cl.[7] .............................................. G03B 17/00
(52) U.S. Cl. ........................ 396/419; 396/420; 396/425
(58) Field of Search ............................ 396/6, 419, 420, 396/425

(56) References Cited

U.S. PATENT DOCUMENTS

| D254,790 S | 4/1980 | Waaske |
| 5,565,943 A | 10/1996 | Muramatsu et al. |
| 5,711,424 A | 1/1998 | Kiesow |
| 5,943,521 A | 8/1999 | Lamphron et al. |
| D413,435 S | 9/1999 | Chapman et al. |
| 6,055,380 A | 4/2000 | Kurokawa et al. |
| 6,134,388 A | * 10/2000 | Balling et al. ............... 224/255 |

* cited by examiner

Primary Examiner—Russell Adams
Assistant Examiner—Michelle Nguyen
(74) Attorney, Agent, or Firm—Roger A. Fields

(57) ABSTRACT

A belt clip is suitable for use with a camera that includes a pair of front and rear cover parts, a main body part between the front and rear cover parts, and a particular device on the main body part that needs electrical energy to be able to operate and has a power switch with a movable switch element that is moved to change the power switch from a normal state to a working state in order to provide electrical energy to the device. The belt clip has a clip portion for holding one's belt between the clip portion and the rear cover part, an actuating portion for moving the movable switch element to change the power switch from its normal to working state, and an intermediate portion between the clip and actuating portions. The intermediate portion is configured to be pivotally coupled with the main body part to permit the clip portion to pivot away from the rear cover part, in order to remove one's belt from between the clip portion and the rear cover part, and to pivot the actuating portion to move the movable switch element to change the power switch from its normal to working state as the clip portion is pivoted away from the rear cover part.

8 Claims, 6 Drawing Sheets

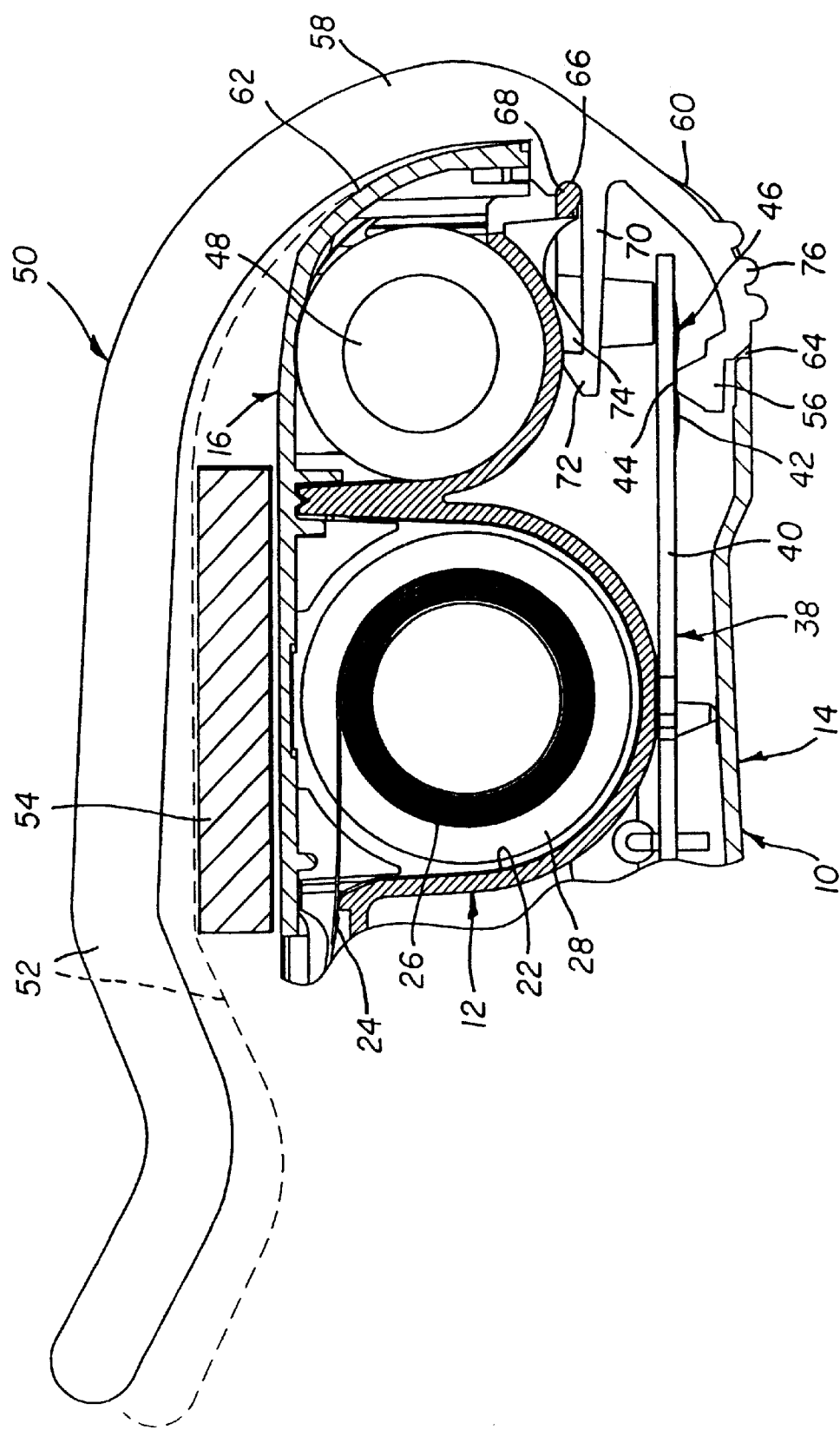

BELT CLIP MOVABLE TO READY AN ELECTRONIC DEVICE SUCH AS AN ELECTRONIC FLASH

CROSS REFERENCE TO RELATED APPLICATIONS

Reference is made to U.S. patent application Ser. No. 09/809,397, filed Mar. 15, 2001, entitled CAMERA WITH BELT CLIP MOVABLE TO READY AN ELECTRONIC DEVICE SUCH AS AN ELECTRONIC FLASH, BY Stiehler et al.

FIELD OF THE INVENTION

The invention relates generally to the field of photography, and in particular to belt clips suitable for use with cameras. More specifically, the invention relates to a belt clip that is movable to ready an electronic device such as an electronic flash.

BACKGROUND OF THE INVENTION

Film and cameras that are all in one, commonly referred to as disposable single-use or one-time-use cameras, have become well known. The one-time-use camera is a simple point-and-shoot type camera comprising an opaque plastic main body part that supports a conventional film cartridge in a cartridge receiving chamber, an unexposed film roll prewound from the film cartridge onto a film supply spool in a film supply chamber, a fixed-focus taking lens, a film metering mechanism with a rotatably supported metering sprocket that engages the filmstrip, a manually rotatable film winding thumbwheel rotatably engaged with a film winding or take-up spool inside the film cartridge, a single-blade shutter, a manually depressible shutter release button, an exposure counter wheel that has a numerical series of evenly spaced exposure count indicia and is incrementally rotated to successively view the exposure count indicia, an anti-backup pawl that engages the exposure counter wheel to prevent its reverse rotation, a direct see-through viewfinder having front and rear viewfinder lenses, and in most models an electronic flash. A pair of opaque plastic front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After each picture is taken with the one-time-use camera, the photographer manually rotates the thumbwheel in a film winding direction to similarly rotate the film winding spool inside the film cartridge. This winds an exposed frame of the filmstrip from a rear backframe opening in the main body part into the film cartridge and advances an unexposed frame of the filmstrip from the unexposed film roll to the rear backframe opening. The rewinding movement of the filmstrip the equivalent of slightly more than one frame width rotates the metering sprocket in engagement with the filmstrip to decrement the exposure counter wheel to its next lower-numbered indicia and to pivot a metering lever into engagement with the thumbwheel in order to prevent further manual rotation of the thumbwheel in the film winding direction. Manually depressing the shutter release button to take another picture pivots the metering lever out of engagement with the thumbwheel to permit renewed rotation of the thumbwheel in the film winding direction. When the maximum number of exposures available on the filmstrip have been made, and the filmstrip is completely wound into the film cartridge, the one-time-use camera is given to a photofinisher who separates the rear cover part from the main body part and removes the film cartridge with the exposed filmstrip from the cartridge receiving chamber. Then, he removes the exposed filmstrip from the film cartridge to develop the latent images and make prints for the customer.

PRIOR ART PROBLEM

The electronic flash is mounted on the main body part between the front and rear cover parts and includes a flash circuit board with a normally open flash charge switch. The flash charge switch consists of one or two fixed switch contacts and a movable switch element that is moved against the one or two fixed switch contacts to close the flash charge switch in order to charge the electronic flash for use. See prior art U.S. Pat. No. 5,565,943 issued Oct. 15, 1996, and No. 5,943,521 issued Aug. 24, 1999, each of which is incorporated in this application. Various activating members are provided to be manually moved to move the movable switch element to close the flash charge switch. For example, U.S. Pat. No. 5,565,943 discloses a lever that is manually pivotable from a folded position to an erected position on the front cover part to move the movable switch element. An improvement from the standpoint of consolidating parts is disclosed in U.S. Pat. No. 5,943,521 in that a protective lens cover is supported to be manually pivoted when open to move the movable switch element.

Often it is desirable to include an accessory belt clip with the camera, but this would be in addition to the activating member for manually moving the movable switch element to close the flash charge switch.

SUMMARY OF THE INVENTION

According to the invention, a belt clip for a camera that includes a pair of front and rear cover parts, a main body part between the front and rear cover parts, and a particular device on the main body part that needs electrical energy to be able to operate and has a power switch with a movable switch element that is moved to change the power switch from a normal state to a working state in order to provide electrical energy to the device, comprises:

a clip portion for holding one's belt between the clip portion and the rear cover part, an actuating portion for moving the movable switch element to change the power switch from its normal to working state, and an intermediate portion between the clip and actuating portions; and the intermediate portion is configured to be pivotally coupled with the main body part to permit the clip portion to pivot away from the rear cover part, in order to remove one's belt from between the clip portion and the rear cover part, and to pivot the actuating portion to move the movable switch element to change the power switch from its normal to working state as the clip portion is pivoted away from the rear cover part.

BRIEF DESCRIPTION OF THE DRAWINGS

FIG. 6 is a partial cross-section view similar to FIG. 5, showing the belt clip pivoted to close a power switch.

DETAILED DESCRIPTION OF THE INVENTION

Figure 1:
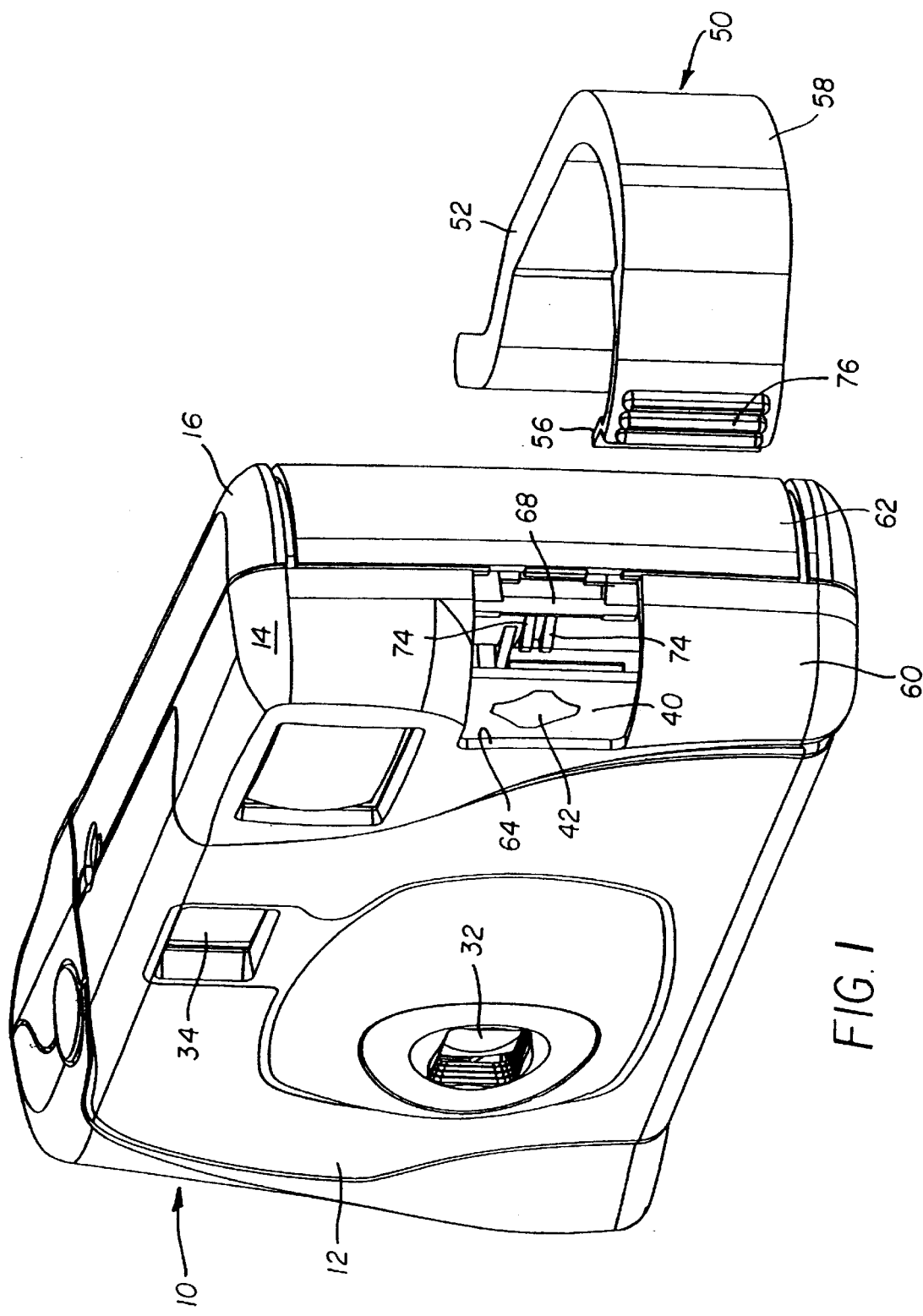
FIG. 1 is a front perspective view of a belt clip for a camera pursuant to a preferred embodiment of the invention, showing the belt clip separated from the camera for clarity of illustration.
Figure 2:
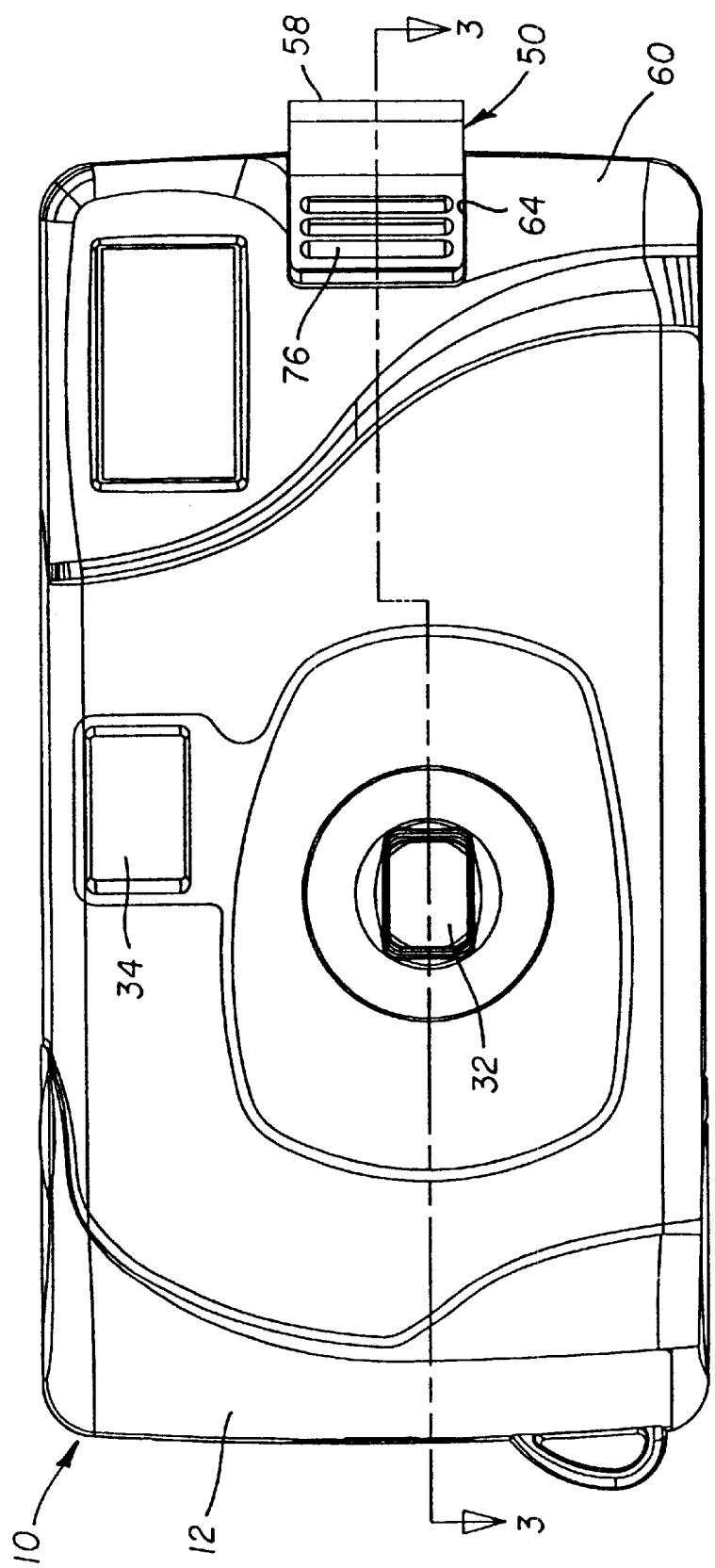
FIG. 2 is a front elevation view of the camera and the belt clip, showing the belt clip connected to the camera.

Referring now to the drawings, FIGS. 1–6 show a disposable one-time-use camera 10 including a plastic opaque interior main body part 12, a plastic opaque exterior front cover part 14, and a plastic opaque exterior rear cover part 16. The front cover part 14 and the rear cover part 16 house the main body part 12 between them and are connected releasably to one another and to the main body part via known hook-in-hole connections.

As is typical, the main body part 12 has a rearwardly open cartridge receiving chamber 18 for a conventional film cartridge 20 and a rearwardly open film supply or film roll chamber 22. See FIG. 3. During manufacture, a filmstrip 24 is prewound from the film cartridge 20 into an unexposed film roll 26 on a film supply spool 28 which is placed in the film supply chamber 22. A rearwardly open backframe opening 30 is located between the cartridge receiving chamber 18 and the film supply chamber 22 for exposing successive frames of the filmstrip 24 when ambient light is received through a front taking lens 32 on the main body part 12.

A known optical viewfinder 34 is mounted on top of the main body part 12 and has a pair of optically aligned front and rear viewfinder lenses for viewing a subject to be photographed. See FIGS. 1 and 2.

A film winding thumbwheel (not shown), rotatably supported on top of the main body part 12, above the cartridge receiving chamber 18, radially protrudes partially from an elongate narrow opening (not shown) in the rear cover part 16 and has a depending coaxial stem (not shown) in coaxial engagement with an exposed top end (not shown) of a film take-up spool 36 inside the film cartridge 20. The film winding thumbwheel has a continuous alternating series of peripheral-edge symmetrical teeth that readily permit the thumbwheel to be manually grasped or fingered to incrementally rotate the thumbwheel in a film winding direction, i.e. counter-clockwise in FIG. 3, to similarly rotate the film take-up spool 36 inside the film cartridge 20. This is done in order to wind an exposed frame of the filmstrip 24 from the backframe opening 30 into the film cartridge 20 after each film exposure, and to move a fresh frame of the filmstrip from the unexposed film roll 26 to the backframe opening. Each time the filmstrip 24 is advanced slightly greater than a frame width, a known metering lever or other known metering device (not shown) engages one of the teeth of the film winding thumbwheel to prevent rotation of the thumbwheel. The metering lever is disengaged from one of the teeth as an incident of each film exposure.

When the filmstrip 24 is wound completely into the film cartridge 20, a rear or bottom portion of the rear cover part 16 which at least partially covers the cartridge receiving chamber 18 is disengaged from the main body part 12 to permit the film cartridge to be removed from the cartridge receiving chamber.

A built-in known electronic flash 38 is mounted on the main body part 12 in the vicinity of the film supply chamber 22. See FIGS. 3–6. The electronic flash unit 38 includes a flat flash circuit board 40 with a manually depressible (movable) dome-shaped switch-closing element 42 and a single fixed contact pad 44 spaced slightly beneath the switch-closing element. A circular periphery of the switch-closing element 42 and the whole contact pad 44 are soldered on the flash circuit board 40. The switch-closing element 42 is deformable to permit it be manually depressed (moved) against the contact pad 44, and it is resilient to recover an original shape separated from the contact pad. See FIGS. 6 and 5. The switch-closing element 42 and the contact pad 44 constitute a normally biased-open flash charge switch 46 which when closed by temporarily deforming the switch-closing element against the contact pad permits a main capacitor (not shown) on the flash circuit board 40 to be charged.

When the normally open flash charge switch 46 is closed by temporarily deforming (moving) the switch-closing element 42 against the contact pad 44, a high-frequency oscillator (not shown) on the flash circuit board 40 converts the dc voltage from a battery 48 to an ac voltage that is stepped up in a transformer (not shown) on the flash circuit board. This high voltage is rectified by a rectifier (not shown) on the flash circuit board 40 back to dc and stored in the main capacitor. The oscillator, the rectifier, the transformer, and the battery 48 constitute a known flash charging circuit that is activated when the flash charge switch 46 is closed. A known monitoring circuit (not shown) on the flash circuit board 40 ignites a flash ready light (not shown) when the stored voltage in the main capacitor approaches a peak capacity.

Figure 3:
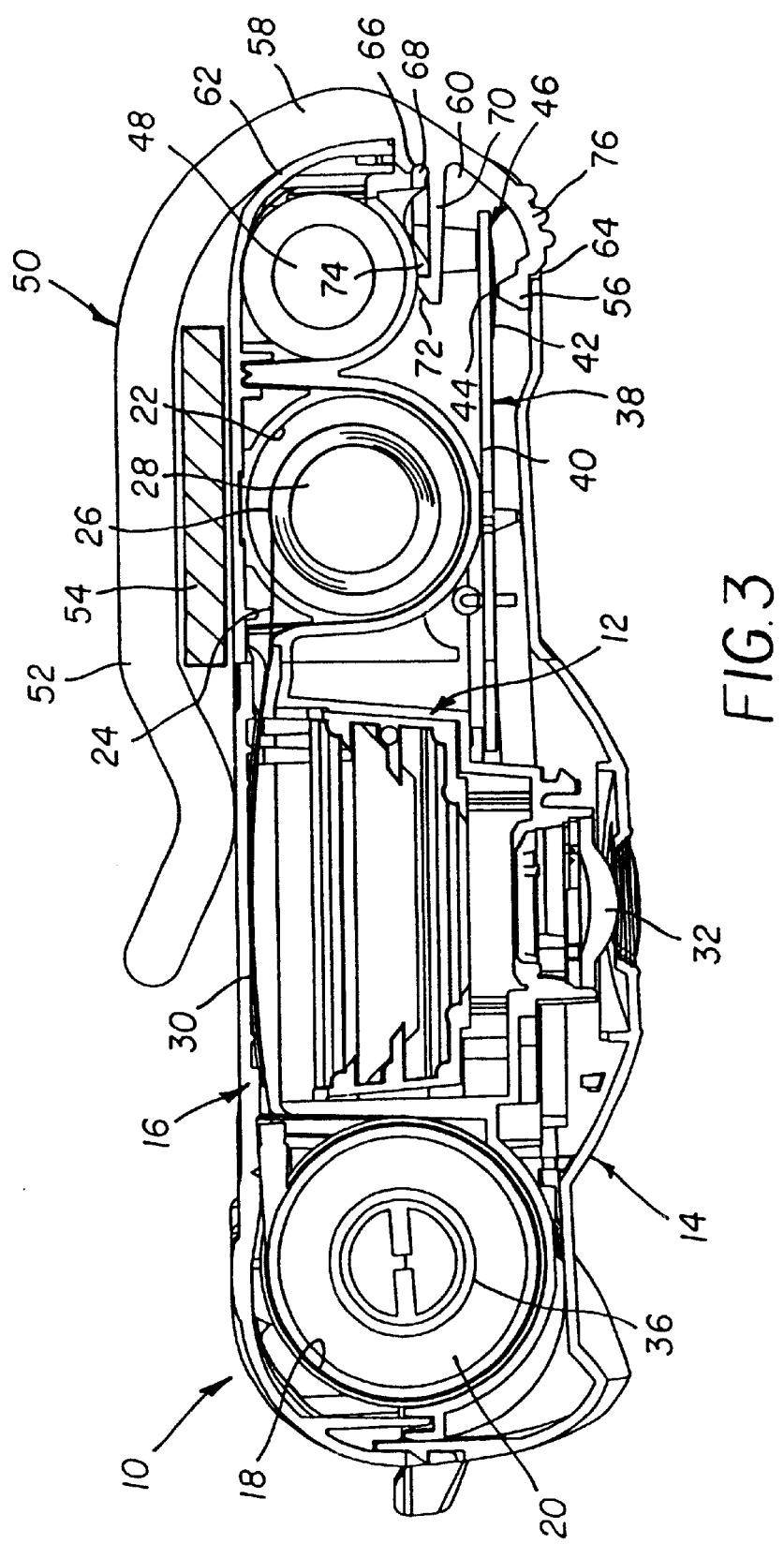
FIG. 3 is a full cross-section view of the camera and the belt clip as seen in the direction of the line-connected arrows 3, 3 in FIG. 2, showing the belt clip connected to the camera.
Figure 4:
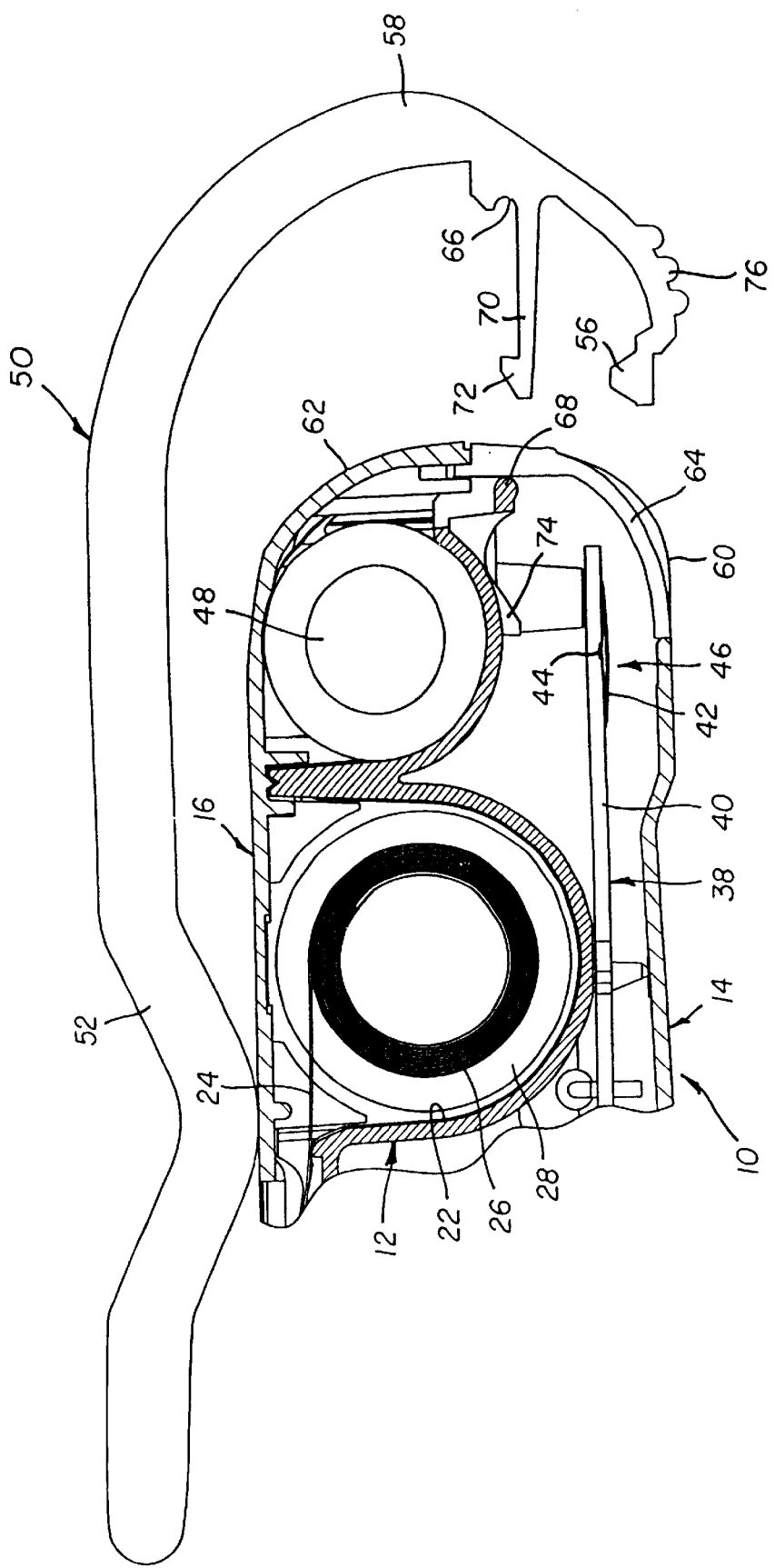
FIG. 4 is a partial cross-section view of the camera and the belt clip, showing the belt clip separated from the camera.
Figure 5:
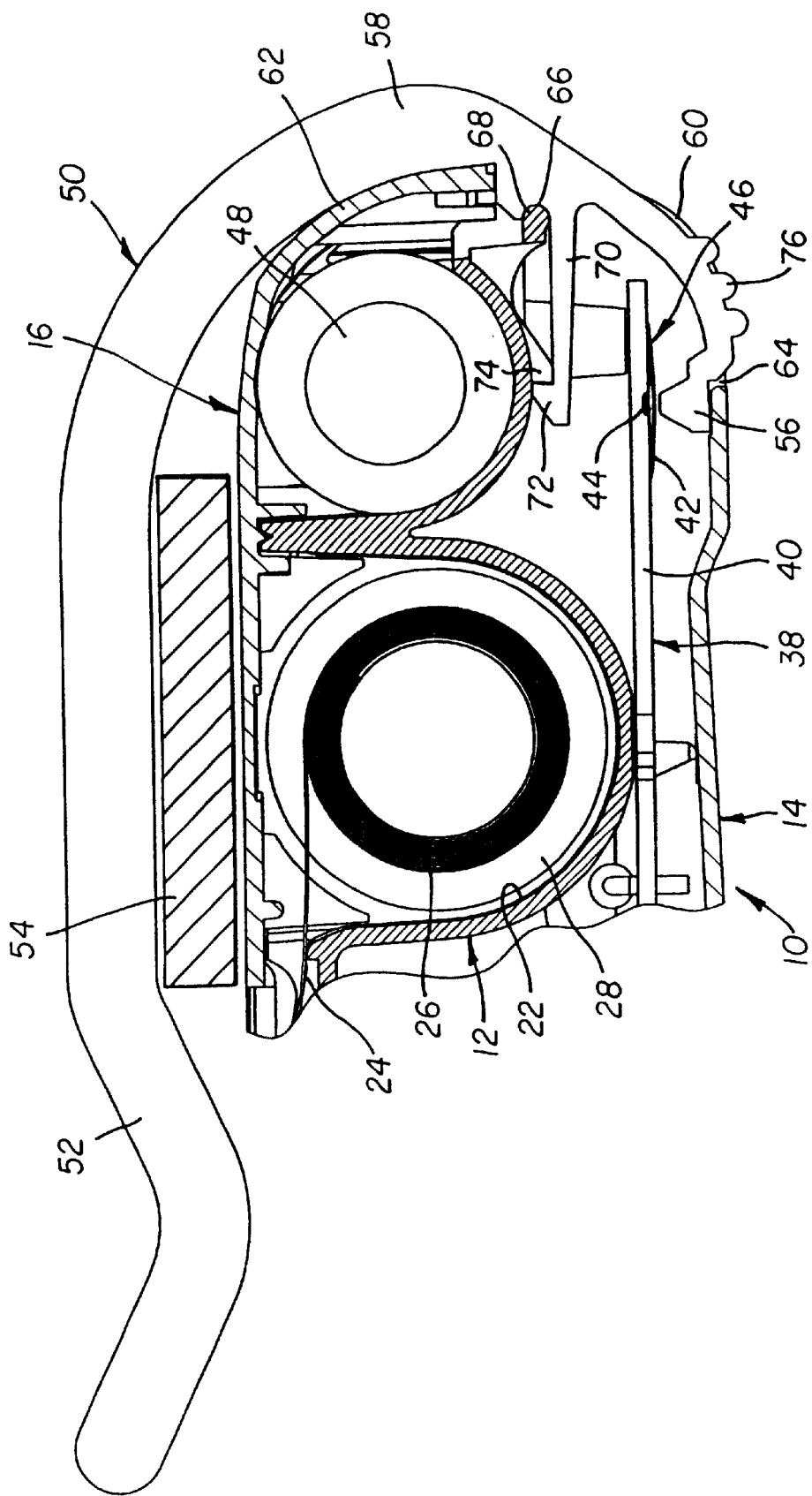
FIG. 5 is a partial cross-section view of the camera and the belt clip, showing the belt clip connected to the camera.

A belt clip 50 has a clip portion 52 facing the rear cover part 16 to hold one's belt 54 between the clip portion and the rear cover part 16 as in FIG. 3, an actuating portion 56 for closing the normally open flash charge switch 46 by temporarily deforming (moving) the switch-closing element 42 against the contact pad 44 as in FIG. 6, and an intermediate portion 58 between the clip and actuating portions. See FIGS. 3–6. The intermediate portion 58 is curved approximately 180° to extend around respective common ends 60 and 62 of the front and rear cover parts 14 and 16, is dimensioned to fit partially within a curved opening 64 in the end 60 of the front cover part, has a concavity 66 in which a fixed fulcrum 68 on the main body part resides to pivotally support the belt clip at its intermediate portion, has a resilient cantilever 70 with a single-hook end 72 that engages two parallel identical projections 74 on the main body part to normally urge (bias) the clip portion towards the rear cover part and to simultaneously urge (bias) the actuating portion 56 away from the switch-closing element 42. When the clip portion 52 is placed on or removed from one's belt 54, that is, when one's belt is received between or removed from between the clip portion and the rear cover part 16, the clip portion is momentarily pivoted away from the rear cover part, in a clockwise direction in FIG. 6 about the fixed fulcrum 68, slightly deforming the resilient cantilever 70, and pivoting the actuating portion 56 in the same direction. The actuating portion 56 then closes the normally open flash charge switch 46 by temporarily deforming (moving) the switch-closing element 42 against the contact pad 44. Thus, when the belt clip 50 is removed from one's belt 54, the electronic flash 38 is ready to be used because its main capacitor will be charged.

The actuating portion 56 includes a manually depressible portion in the form of a ribbed finger grip 76 at the opening 64 in the front cover part 14, which can be manually depressed to optionally pivot the actuating portion 56 in a clockwise direction in FIG. 6. The actuating portion 56 then closes the normally open flash charge switch 46 by temporarily deforming (moving) the switch-closing element 42 against the contact pad 44.

The actuating portion 56 includes a manually depressible portion in the form of a ribbed finger grip 76 at the opening 64 in the front cover part 14, which can be manually depressed to optionally pivot the actuating portion 56 in a clockwise direction in FIG. 6. The actuating portion 56 then closes the normally open flash charge switch 46 by temporarily deforming (moving) the switch-closing element 44 against the contact pad 44.

To assemble the belt clip 50 to the camera 10, the concavity 66 is placed onto the fixed fulcrum 68 and the single-hook end 72 is engaged with the two projections 74. See FIGS. 5 and 6. This locates the clip portion 52 facing the rear cover part 16 and the actuating portion 56 inward of the opening 64 and close to the switch-closing element 42.

The invention has been described with reference to a preferred embodiment. However, it will be appreciated that variations and modifications can be effected by a person of ordinary skill in the art without departing from the scope of the invention. For example, the switch-closing element 42 that is manually depressed against the contact pad 44 to close the normally open flash charge switch 46 could be located on the belt clip 50 in place of the actuating portion 56. In this instance, as in the preferred embodiment, the switch closing element 42 would have to be conductively connected to the flash circuit board 40.

PARTS LIST 10. one-time-use camera
12. main body part
14. front cover part
16. rear cover part
18. cartridge receiving chamber
20. film cartridge
22. film supply or film roll chamber
24. filmstrip
26. unexposed film roll
28. film supply spool
30. backframe opening
32. front taking lens
34. viewfinder
36. film take-up spool
38. electronic flash
40. flash circuit board
42. movable switch-closing element
44. fixed contact pad
46. flash charge switch
48. battery
50. belt clip
52. clip portion
54. one's belt
56. actuating portion
58. intermediate portion
60. end
62. end
64. curved opening
66. concavity
68. fixed fulcrum
70. resilient cantilever
72. single-hook end
74, 74. projections
76. manually depressible portion/ribbed finger grip

What is claimed is:

1. A belt clip for a camera that includes a pair of front and rear cover parts, a main body part between the front and rear cover parts, and a particular device on the main body part that needs electrical energy to be able to operate and has a power switch with a movable switch element that is moved to change the power switch from a normal state to a working state in order to provide electrical energy to the device, said belt clip comprising:

a clip portion for holding one's belt between said clip portion and the rear cover part, an actuating portion for moving the movable switch element to change the power switch from its normal to working state, and an intermediate portion between said clip and actuating portions; and said intermediate portion is configured to be pivotally coupled with the main body part to permit said clip portion to pivot away from the rear cover part, in order to remove one's belt from between said clip portion and the rear cover part, and to pivot said actuating portion to move the movable switch element to change the power switch from the normal to working state as said clip portion is pivoted away from the rear cover part.

2. A belt clip as recited in claim 1, wherein said intermediate portion has a concavity configured to receive a fulcrum on the camera to pivotally support said belt clip at said intermediate portion.

3. A belt clip as recited in claim 1, wherein said actuating portion has a manually depressible finger grip which can be manually depressed to pivot said actuating portion to move the movable switch element to change the power switch from the normal to working state.

4. A belt clip as recited in claim 1, further comprising:
a resilient cantilever with a free hooked end for engaging the camera.

5. A belt clip as recited in claim 1, wherein said intermediate portion is curved to extend around respective common ends of the front and rear cover parts and is dimensioned to fit within an opening in the end of the front cover part.

6. A belt clip as recited in claim 5, wherein said intermediate portion is inherently biased to pivot said clip portion towards from the rear cover part and said actuating portion away from the movable switch element when said intermediate portion is pivotally coupled with the main body part.

7. A belt clip for a camera that includes a pair of front and rear cover parts, a main body part between the front and rear cover parts, and a particular device on the main body part that needs electrical energy to be able to operate and has a power switch with a movable switch element that is moved to change the power switch from a normal state to a working state in order to provide electrical energy to the device, said belt clip comprising:

clip means for holding one's belt between said clip means and the rear cover part; and actuating means for moving the movable switch element to change the power switch from its normal to working state.

8. A belt clip as recited in claim 7, further comprising:
intermediate means between said clip means and said actuating means for pivotally coupling with the main body part to permit said clip means to pivot away from the rear cover part, in order to remove one's belt from between said clip means and the rear cover part, and to pivot said actuating means to move the movable switch element to change the power switch from the normal to working state as said clip means is pivoted away from the rear cover part.

* * * * *